J. A. BIMLER.
FARM GATE.
APPLICATION FILED APR. 19, 1919.
1,315,006.
Patented Sept. 2, 1919.
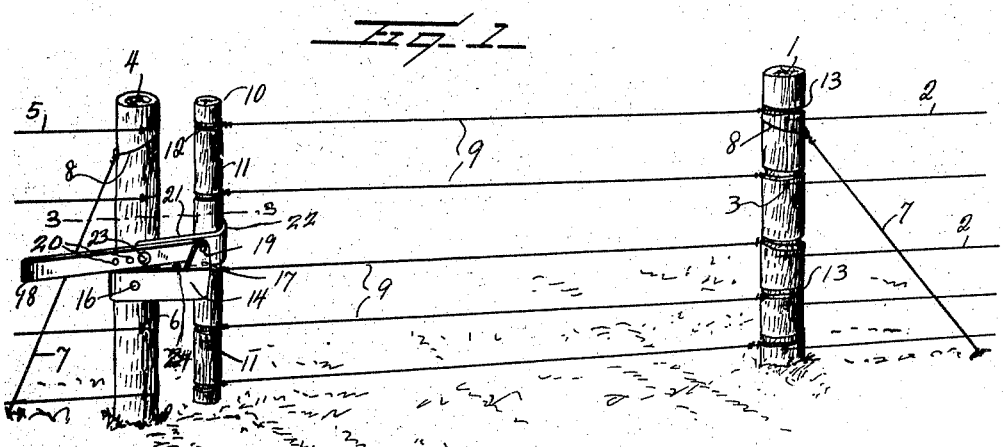
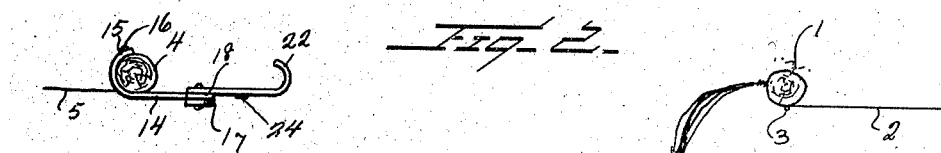
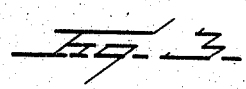
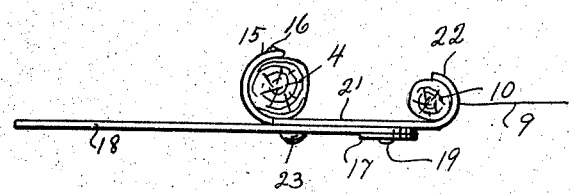
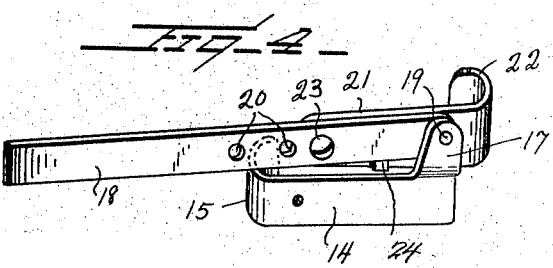
Inventor
J. A. Bimler
By Watson E. Coleman
Attorney

UNITED STATES PATENT OFFICE.

JOHN A. BIMLER, OF MICHIGAN, NORTH DAKOTA.

FARM-GATE.

1,315,006.　　　　Specification of Letters Patent.　　Patented Sept. 2, 1919.

Application filed April 19, 1919. Serial No. 291,312.

*To all whom it may concern:*

Be it known that I, JOHN A. BIMLER, a citizen of the United States, residing at Michigan, in the county of Nelson and State of North Dakota, have invented certain new and useful Improvement in Farm-Gates, of which the following is a specification, reference being had to the accompanying drawings.

This invention relates to an improved gate, which may be used in connection with any construction of fence, preferably those on farms, especially wire fences.

One of the objects of the invention is to provide a flexible gate, which may be easily and quickly opened very conveniently, and without requiring very much energy or strength on the part of the one opening the gate.

A further object of the invention is the provision of a gate of this kind, which may be easily and quickly applied with a hammer, and one, two or more spikes.

A further object of the invention is the provision of a flexible gate capable of being attached to either post of the gate opening, and may be easily opened with one hand.

A further object of the invention is the provision of a flexible gate comprising a plurality of flexible wires, which, when the gate is closed and the gate post detachably connected to one of the gate opening posts, may be kept constantly stretched.

A further object of the invention is the provision of a gate latching means, to which the gate post may be connected, to hold the wires of the gate stretched, and in position alined with the wires of the fence. A further object of the invention is the provision of a gate of this general character, which is simple, efficient, and practical in construction and may be manufactured for a small cost, and sold to the trade at a reasonable profit.

A further object of the invention is the provision of a one hand operated gate fastener, which comprises a stationary member carried on one of the posts of the gate opening, and means pivotally mounted on the stationary member and having a pivoted gate hook or holding device to engage a gate post, said means being so arranged relatively to the stationary member and the fastener or gate holder, whereby as said means is operated in one direction, the wires of the gate will be constantly stretched, and when operated in the opposite direction, the gate post will be released.

A further object of the invention is the provision of means whereby the fastener or gate holder may be connected to the operating means in different positions.

While the design and construction at present illustrated and set forth is deemed preferable, it is obvious that as a result of a reduction of the invention to a more practical form for commercial purposes, the invention may be susceptible to changes, and the right to these changes is claimed, provided they are comprehended within the scope of what is claimed.

The invention comprises further features and combination of parts, as will be hereinafter set forth, shown in the drawings and claimed.

In the drawings:

Figure 1 is a perspective view of the gate constructed in accordance with the invention.

Fig. 2 is a view of the gate showing it open.

Fig. 3 is a sectional view on line 3—3 of Fig. 1, at a point a little above the fastener or latching means.

Fig. 4 is an enlarged detail view of the gate fastener or latching means.

Referring to the drawings 1 designates a fence post, to which the usual fence wires 2 may be connected by means of screw eyes 3, and 4 denotes the latch supporting post, to which other fence wires 5 may be connected, by means of screw eyes 6. The posts 1 and 4 are braced by means of the stay wires 7. These stay wires have their lower ends anchored in any suitable manner to the ground and their upper ends formed into loops 8 engaging the posts. The gate proper comprises a plurality of flexible wires 9, each having one of its ends formed into a loop engaging the post 1. The other ends of the flexible wires of the gate are connected to a bar 10, by means of loops 11. This bar 10 may be constructed of any suitable material, either a wood bar, or a metal bar. The bar 10 is provided with a plurality of annular grooves 12, in which the loops of the gate wires engage, so as to hold the loops of the gate wires evenly spaced, and also preventing displacement. The post 1 is also provided with annular grooves 13, to receive the loops of the gate wires.

A stationary member 14 is provided and has one end terminating in a semi-circular part 15, which engages the post 4, there being nails or spikes or other suitable means 16 driven through the curved end of the stationary member and into the post 4, so as to hold the stationary member in a fixed position. The stationary member 14 has an upstanding arm 17, to which a lever 18 is pivoted, as indicated at 19. This lever is provided with a plurality of apertures 20. A holding plate 21 is provided and has one end terminating in a semi-circular curved part 22, to engage the bar of the gate. The other end of the holding plate receives a pivot pin 23, which may engage any one of the apertures or openings 20 of the lever, so as to pivotally mount the holding plate on the lever, in such wise as to permit the holding plate to be adjusted in different positions. The upstanding arm of the stationary member or plate is so arranged relatively to the pivot of the holding plate, that when the holding plate is connected to the bar of the gate, and the lever moves on its pivot downwardly, the pivot of the holding plate will become positioned below the pivot of the lever on the stationary member, thereby necessitating considerable pressure on the free end of the lever upwardly in a vertical direction, so as to move the pivot of the holding plate above a horizontal plane which passes through the pivot of the lever on the stationary member and the pivot between the holding plate and the lever, that is when the lever approaches a horizontal plane.

It is to be noted that when the holding plate is connected to the bar of the gate, and the lever moved downwardly, an urging or pulling action is imparted on the bar of the gate, and the flexible wires of the gate are put under tension, thereby holding them taut. The holding plate on one of its edges is provided with a spring tongue 24, which engages under the lower edge of the lever at a point between the pivot of the lever on the stationary member and the pivot of the holding plate on the lever, thereby assisting in holding the lever in its downward position. However, by applying sufficient pressure on the free end of the lever, the tension of the spring tongue may be overcome and the lever tilted vertically, so that the holding plate may be disengaged from the bar of the gate. In order to open the gate an upward movement is imparted on the lever, which will move the pivot of the holding plate above a horizontal plane through the pivot of the lever to the arm, whereby the hook of the holding plate may be free to be disconnected from the bar of the wire gate. The gate may be folded back flexibly, to permit of the passage of a vehicle through the gate opening, or the bar of the gate may be supported in the hands, and the wires allowed to flex, in order to permit a person to pass through the gate opening.

The invention having been set forth, what is claimed as new and useful is:

The combination with a fence wire gate including a vertical gate bar, a fixed post, a stationary member having a curved end secured to the fixed post and provided with an upstanding arm, a lever pivoted to the upstanding arm, a holding plate having a hook end engaging the bar of the gate, the other end of the holding plate being adjustably pivoted to the lever at a point relatively to the pivot of the lever to the arm, whereby when the lever is moved downwardly, the pivot of the holding plate to the lever will become positioned at a point below a horizontal plane through the pivot of the lever to the arm, and means on one of the edges of the holding plate to engage the lever to prevent accidental upward movement of the lever.

In testimony whereof I hereunto affix my signature in the presence of two witnesses.

JOHN A. BIMLER.

Witnesses:
F. H. ERICKSON,
H. LAMB.

Copies of this patent may be obtained for five cents each, by addressing the "Commissioner of Patents, Washington, D. C."